US007451238B2

(12) United States Patent
Taraci

(10) Patent No.: US 7,451,238 B2
(45) Date of Patent: Nov. 11, 2008

(54) METHOD AND APPARATUS FOR PROVIDING UNIVERSAL WEB ACCESS FUNCTIONALITY

(75) Inventor: Brian Richard Taraci, Foothill Ranch, CA (US)

(73) Assignee: RGB Systems, Inc., Anaheim, CA (US)

(*) Notice: Subject to any disclaimer, the term of this patent is extended or adjusted under 35 U.S.C. 154(b) by 1082 days.

(21) Appl. No.: 10/678,605

(22) Filed: Oct. 3, 2003

(65) Prior Publication Data
US 2004/0162912 A1 Aug. 19, 2004

Related U.S. Application Data

(60) Provisional application No. 60/416,101, filed on Oct. 4, 2002.

(51) Int. Cl.
*G06F 15/16* (2006.01)
*G06F 13/28* (2006.01)
*G06F 7/50* (2006.01)
*H03K 19/21* (2006.01)

(52) U.S. Cl. .................. 709/249; 709/203; 709/217; 709/219; 326/56; 710/8

(58) Field of Classification Search ................ 709/203, 709/217, 219, 249; 710/8, 10; 326/56
See application file for complete search history.

(56) References Cited

U.S. PATENT DOCUMENTS 5,220,673 A * 6/1993 Dalrymple et al. ............. 713/1

5,956,487 A    9/1999  Venkatraman et al.
6,008,805 A *  12/1999 Land et al. ................. 715/744

(Continued)

FOREIGN PATENT DOCUMENTS

WO    WO97/18636 A    5/1997

(Continued)

OTHER PUBLICATIONS

Axelson, Jan. "Serial Port Central". Oct. 18, 2001. Accessed Nov. 19, 2007. <http://web.archive.org/web/20011018225008/http://www.lvr.com/serport.htm>.*

(Continued)

*Primary Examiner*—Krisna Lim
*Assistant Examiner*—Philip J Chea
(74) *Attorney, Agent, or Firm*—The Hecker Law Group, PLC

(57) ABSTRACT

A flexible electronic asset management system using Ethernet connectivity for electronic devices is presented. The invention enables multiple electronic devices to be controlled, monitored, and accessed from any browser connected to a computer network. A flattened stack approach is used to process network packet data. The flattened stack approach treats the network packet as a single string of data and uses the first few bytes of information to decide whether to drop or process the incoming data thus providing for faster network traffic processing. Since the lowest layer of the OSI stack has knowledge of what applications are active in the upper layers, the flattened stack allows the packet to be discarded at the earliest possible point so no processing power is wasted. The flattened stack also organizes its check/processing based on the raw data stream thus minimizing buffer requirements and providing for easier implementation into hardware.

36 Claims, 15 Drawing Sheets

Flex I/O Port Settings

| Port | Mode | Pull-up | Threshold* | Lower* (0.25,3V) | Upper* (0.25,3V) | Status |
|------|------|---------|------------|------------------|------------------|--------|
| 1 | Digital Input | ✓ | ✓ | 0.9 | 1.0 | Off |
| 2 | Digital Output | ✓ | ☐ | | | Off (5V) |
| 3 | Digital Output | ✓ | ☐ | | | Off (5V) |
| 4 | Digital Output | ✓ | ☐ | | | Off (5V) |

[Submit] [Cancel]

\* Lower and Upper Threshold settings are for Digital Input only.

U.S. PATENT DOCUMENTS

| | | |
|---|---|---|
| 6,139,177 A | 10/2000 | Venkatraman et al. |
| 6,170,007 B1 | 1/2001 | Venkatraman et al. |
| 6,405,238 B1 | 6/2002 | Votipka |
| 6,430,623 B1 | 8/2002 | Alkhatib |
| 6,433,685 B1 | 8/2002 | Struble et al. |
| 6,453,687 B2 | 9/2002 | Sharood et al. |
| 6,475,016 B1 | 11/2002 | Heidenreich et al. |
| 6,493,517 B1 | 12/2002 | Hanson |
| 6,529,936 B1 | 3/2003 | Mayo et al. |
| 6,648,667 B2 | 11/2003 | Heidenreich et al. |
| 6,652,169 B2 | 11/2003 | Parry |
| 6,666,594 B2 | 12/2003 | Parry |
| 6,676,310 B2 | 1/2004 | Simpson et al. |
| 6,822,954 B2 * | 11/2004 | McConnell et al. .......... 370/352 |
| 6,836,796 B2 * | 12/2004 | Schwartz et al. ............. 709/223 |
| 7,130,670 B2 * | 10/2006 | Fifield ..................... 455/575.7 |
| 7,293,236 B2 * | 11/2007 | Choi et al. .................. 715/734 |
| 2002/0120728 A1 | 8/2002 | Braatz et al. |
| 2002/0131569 A1 | 9/2002 | Ito et al. |

FOREIGN PATENT DOCUMENTS

| | | |
|---|---|---|
| WO | WO00/65774 A | 11/2000 |
| WO | WO00/67429 A | 11/2000 |

OTHER PUBLICATIONS

Computer Hope. "Computer Hardware". Aug. 5, 2001. Accessed Nov. 20, 2007. <http://web.archive.org/web/20010805073052/http://www.computerhope.com/help/nic.htm>.*

Cisco. "Ethernet Technologies". Jan. 24, 2002. Accessed Nov. 23, 2007. <http://web.archive.org/web/20020124175541/http://www.cisco.com/univercd/cc/td/doc/cisintwk/ito_doc/ethernet.htm>.*

* cited by examiner

Serial Port Settings

Serial Port: ⊙1 ○2
Port type: RS-232 ▶
Baud rate: 9600 ▶
Data bits: 8 ▶
Parity: None ▶
Stop bits: 1 ▶
Flow control: None ▶

[Submit] [Cancel]

*FIG. 3*

| Flex I/O Port Settings | | | | | |
|---|---|---|---|---|---|
| Port | Mode | Pull-up | Threshold* | Lower* (0.25,3V) | Upper* (0.25,3V) | Status |
| 1 | Digital Input ▶ | ✓ | ✓ | 0.9 | 1.0 | Off ▶ |
| 2 | Digital Output ▶ | ✓ | | | | Off (5V) ▶ |
| 3 | Digital Output ▶ | ✓ | | | | Off (5V) ▶ |
| 4 | Digital Output ▶ | ✓ | | | | Off (5V) ▶ |

[ Submit ]  [ Cancel ]

* Lower and Upper Threshold settings are for Digital Input only.

*FIG. 4*

METHOD AND APPARATUS FOR PROVIDING UNIVERSAL WEB ACCESS FUNCTIONALITY

CROSS REFERENCE TO RELATED APPLICATIONS

This application claims priority from U.S. Provisional Application No. 60/416,101 filed on Oct. 4, 2002, the specification of which is herein incorporated by reference.

BACKGROUND OF INVENTION

This invention relates to the field of electronic system management. More specifically the invention relates to web based management and control of electronic equipments.

BACKGROUND

Electronic appliances have become ubiquitous in the home and workplace, to the point where very few tasks exist without some form of electronic component. Most electronic appliances are initially designed for a particular purpose, with little foresight into secondary issues such as monitoring and control. However, as an electronic appliance evolves, such secondary issues are frequently addressed with new designs that improve efficiency and convenience through enhanced monitoring and control capabilities. For example, televisions initially were controlled by manual operation of control knobs on the set box, but evolution of the television design has brought about the IR remote control, allowing a viewer to change channels without leaving his seat.

Unfortunately, those new control designs are frequently proprietary in nature, targeted solely at the subject appliance with no consideration for other possible electronic appliances in the same environment. Also, unlike the common television viewer scenario, it is often desired to monitor and control electronic appliances from a more remote vantage point. For example, as business enterprises expand their use of electronic appliances, the need arises for the capability to monitor and control multiple appliances from a centralized location within the corporate environment, which may span the world.

Systems of the prior art that attempt to overcome some of these obstacles generally focus narrowly on a specific electronic appliance and design a proprietary monitoring and control system that allows a person using a dedicated electronic controller to communicate with a single piece of electronic equipment. Where no communication path exists, this solution often entails installing a dedicated wiring system to accomplish monitoring and control. Where a network exists, some systems of the prior art use the network to pass proprietary communication packets between the controller and the electronic appliance. To control multiple appliances, additional communication packets must be transmitted across the network. This leads to undesired levels of control traffic on corporate networks as the number of appliances in an enterprise increases.

Another drawback to prior art systems is that they frequently use a computer workstation or other stationary device as the dedicated controller. This detracts from use of the workstation for other purposes, as well as making it difficult to have monitoring and control capabilities from any other location, absent the inefficient use of redundant, dedicated controllers.

For the foregoing reasons, it is desirable to have a monitoring and control system that permits a person to monitor and control multiple electronic appliances of multiple types, where such monitoring and control capability is available from more than one location, where computing resources are not limited by the dedicated use of those resources for proprietary systems, and where impact on network traffic can be minimized by centralizing control of multiple appliances.

BRIEF DESCRIPTION OF DRAWINGS

FIG. 3 is an illustration of a graphical user interface for configuring the serial port transceiver.

FIG. 4 is an illustration of a browser interface for configuring flexible I/O ports.

SUMMARY OF INVENTION

Figure 1:
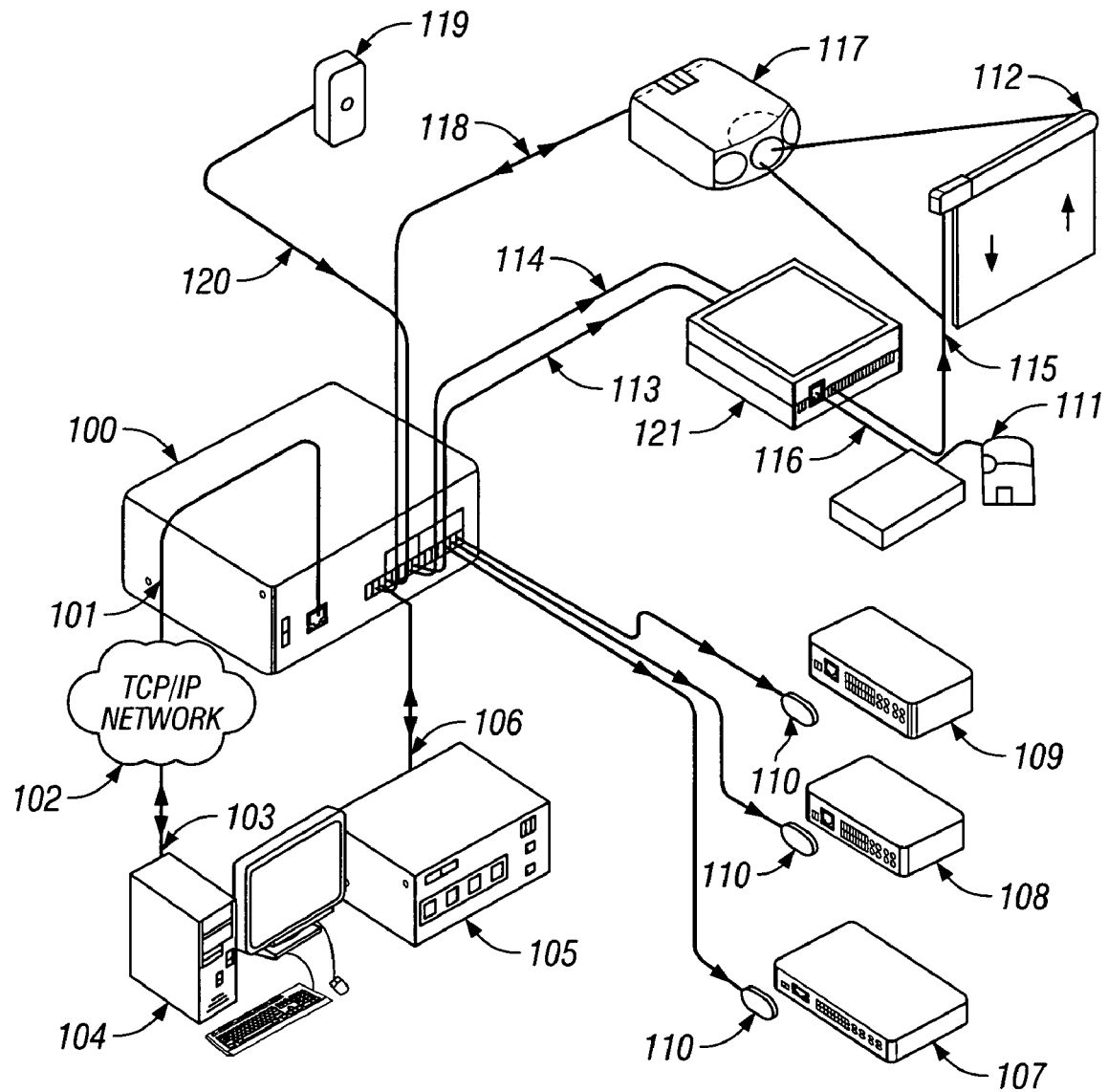
FIG. 1 is an example layout of a web-enabled access and control architecture for multiple electronic devices, in accordance with an embodiment of the present invention.

The present invention provides a solution to the prior art issues discussed above by providing flexible Ethernet connectivity for electronic devices. This enables multiple electronic devices to be controlled, monitored, and accessed from any browser connected to a computer network, e.g., local area network (LAN), wide area network (WAN), or the Internet. Embodiments of the invention provide Internet Protocol (IP) connectivity for monitoring and controlling dumb (no processing power) and smart devices ranging from simple home appliances such as televisions, stereos, alarms, etc, to complex industrial applications such as multiple projectors, plasma displays, switchers; land other electronic products.

A user may configure embodiments of the present invention to provide information needed for proactive service and support for preventive maintenance using such conveniences as e-mail notification. With e-mail notification, technical support administrators can receive failure and service messages through an e-mail enabled cell phone, personal digital assistant (PDA), pager, or Internet e-mail account. For secure installations that do not allow Internet access, online monitoring can still be performed proactively. Within an existing secure infrastructure, e-mail notification of failures and repairs is possible without compromising system or facility security.

The present invention provides dynamically configurable web pages for asset management. For instance, a user may program the invention to dynamically obtain device and/or equipment status when its web page is requested by a web browser. Requests from a web browser may be sent via URL encoding or other transfer mechanism. Upon receiving the request, the data is parsed to determine what information is requested, or what action to take.

Processing of and dynamic creation of web pages are fast because embodiments of the invention use a flattened network stack for network traffic processing instead of the traditional seven layer OSI (International Standards Organization) stack. A flattened stack allows for faster processing of network traffic to determine if the information contained in the traffic is of interest. The flattened stack approach treats the data as one long piece of flattened data. By contrast, the seven layer model requires processing at various layers before the actual data is retrieved at the seventh layer (i.e. the Application Layer). A flattened stack allows one to immediately check the first one or two bytes of data to determine and obtain information of interest without the added burden of processing in the previous six network layers of the OSI model.

The lowest layer of the OSI stack has knowledge of what applications are active in the upper layers, thus the flattened stack allows the packet to be discarded at the earliest possible point so no processing power is wasted. The flattened stack implementation organizes its check/processing based on the raw data stream thus minimizing buffer requirements and providing for easier implementation into hardware.

DETAILED DESCRIPTION

The present invention is a method and apparatus for providing Web-based interfaces for electronic appliances. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

The present invention provides an apparatus with flexible Ethernet connectivity for electronic devices, enabling multiple electronic devices to be controlled, monitored, and accessed from any browser connected to a computer network, e.g., local area network (LAN), wide area network (WAN), or the Internet. Embodiments of the invention provide Internet Protocol (IP) connectivity for monitoring and controlling devices ranging from simple home appliances such as televisions, stereos, alarms, etc, to complex industrial applications such as multiple projectors, plasma displays, switchers, and other electronic products.

Embodiments of the invention may provide one or more input/output (I/O) ports for connection to electronic appliances. For instance, an embodiment may include configurable I/O ports for analog or digital I/O signals; serial ports such as RS-232, RS422, and RS-485; and infrared (IR) ports for controlling virtually any IR controllable device.

Internet Protocol (IP) connectivity provides the ability to remotely and proactively monitor and troubleshoot various types of electronic equipment. Embodiments of the present invention may provide Ethernet connectivity to electronic devices that are not otherwise "Web enabled," eliminating the necessity for electronics manufacturers to web-enable every piece of electronic equipment.

By providing Web connectivity via an embodiment of the invention, such as device 100 of FIG. 1, a variety of electronic products can be managed and supported by a user, technician, or administrator at any time from any computer with a web browser. For instance, an audio/visual (A/V) technician can control presentations thousands of miles from the presentation location. The technician can also monitor the health of the equipment in order to provide proactive service. For example, a user can check the activity and status of a projector's power, connections, lamp life, or temperature, or even turn off multiple projectors at once—all from the convenience of any Web-enabled monitoring station. In the case of lamp life, a technician can monitor the projector lamp life for one or more projectors, from his office or other location, and order replacement lamps when the useful life of the lamps are about to expire, thus preventing service interruption.

Proactive service, support and preventive maintenance may be provided through such conveniences as e-mail notification. With e-mail notification, technical support administrators can receive failure and service messages through an e-mail enabled cell phone, personal digital assistant (PDA), pager, or Internet e-mail account. For secure installations that do not allow Internet access, online monitoring can still be performed proactively. Within an existing secure infrastructure, e-mail notification of failures and repairs is possible without compromising system or facility security.

In one or more embodiments of the present invention, a web server is configured with random access memory for storing a large number of device drivers, web pages, and other software, which may be in the form of Hyper-Text Markup Language (HTML), JavaScript, Flash™ animation, and/or graphics files. Customizable web pages can be created and stored using off-the-shelf software programs such as Macromedia® Dreamweaver and Microsoft FrontPage®. Using intuitive Web-based software with a graphical user interface (GUI), users can access a variety of electronic equipment through embodiments of the present invention.

FIG. 1 is an example layout of a web-enabled access and control architecture for multiple electronic devices, in accordance with an embodiment of the present invention. In this illustration, device 100 comprises the engine or Web Server of the present invention. The configuration of device 100 may include any combination of input/output ports and may be embedded into an electronic equipment or as a standalone server. For instance, in the standalone configuration shown in FIG. 1, device 100 has multiple infrared (IR) ports connecting device 100 to IR emitters 110. In this embodiment, the IR ports are output ports which drive the IR emitters 110 for controlling electronic devices such as VCR 109, DVD 108, and Digital Satellite System (DSS) Receiver 107.

Embodiments of the present invention may also include input/outputs such as RS-232 serial ports and other general purpose ports. For instance, device 100 includes RS-232 ports for controlling A/V equipment, such as switcher 105 through serial cable 106, and projector 117 through serial cable 118. The general input/output ports may be used to couple device 100 to relay box 121 through cables 113 and 114. In turn, relay box 121 controls display screen 112 through cable 115 and lighting system 111 through cable 116. A general purpose input/output port may also be used for connection to a motion sensor device 119 through cable 120, e.g., to detect when someone enters the room containing the valuable A/V equipment.

Device 100 includes a port for connection to a network. For instance, device 100 may include an Ethernet port with an RJ-45 connector coupled to connection line 101 for access to network 102. Network 102 may comprise a TCP/IP network over land lines, for instance. Other connections from device 100 to the network may include wireless communication systems such as terrestrial, satellite, cellular, infrared, etc.

An operator may monitor and/or control any of the equipment connected to device 100 by using web access station 104, e.g., a computer station, which is connected to the network 102 via communication line 103. Again, communication line 103 may include any desirable communication method, for example, landlines and/or wireless.

In this illustration, an authorized user may log onto web access station 104 to view, from anywhere in the world, one or more pieces of equipment connected to device 100. Web access station 104 may be any interface device (such as a laptop, workstation, PDA, cellular phone, etc.) equipped with a web browser and a connection to network 102.

In one embodiment, the authorized user enters an object identification number, typically an IP Address, for the specific device 100 through which monitoring is desired. The web browser sends an HTTP get request, for example, to the specified device 100, and that device 100 sends its home page (e.g., in HTML format) to the user's web browser for display. Device 100 may send a pre-formatted web page, or, in other embodiments, device 100 may generate a web page by, for example, organizing suitable HTML tags and parameters into an HTML file that is sent to the user's web browser at web access station 104. Multiple users may access and control device 100 simultaneously through different web browsers.

In one example application, the apparatus of FIG. 1 may be configured to automatically enable and power-up A/V equipment when someone enters the room. For instance, when a user enters a room with motion sensor 119, motion sensor 119 detects the motion and sends the motion information to device 100 through connection 120. Device 100 is user programmable such that upon sensing the motion, Device 100 enables projector 117, lighting system 111, and display screen 112 for a specific amount of time. Another embodiment may engage a camera connected to one of the output ports of device 100, which can record the activity causing the motion disturbance on one of recording devices 107, 108, and 109. The apparatus may also be setup to alert another person of the disturbance and allow that other person to view the recorded information from anywhere in the world using a web browser. This may be accomplished, for instance, by recording the disturbance in a digital media connected to one of the available serial ports and to the network, and sending an e-mail notification to the appropriate entity.

Figure 2:
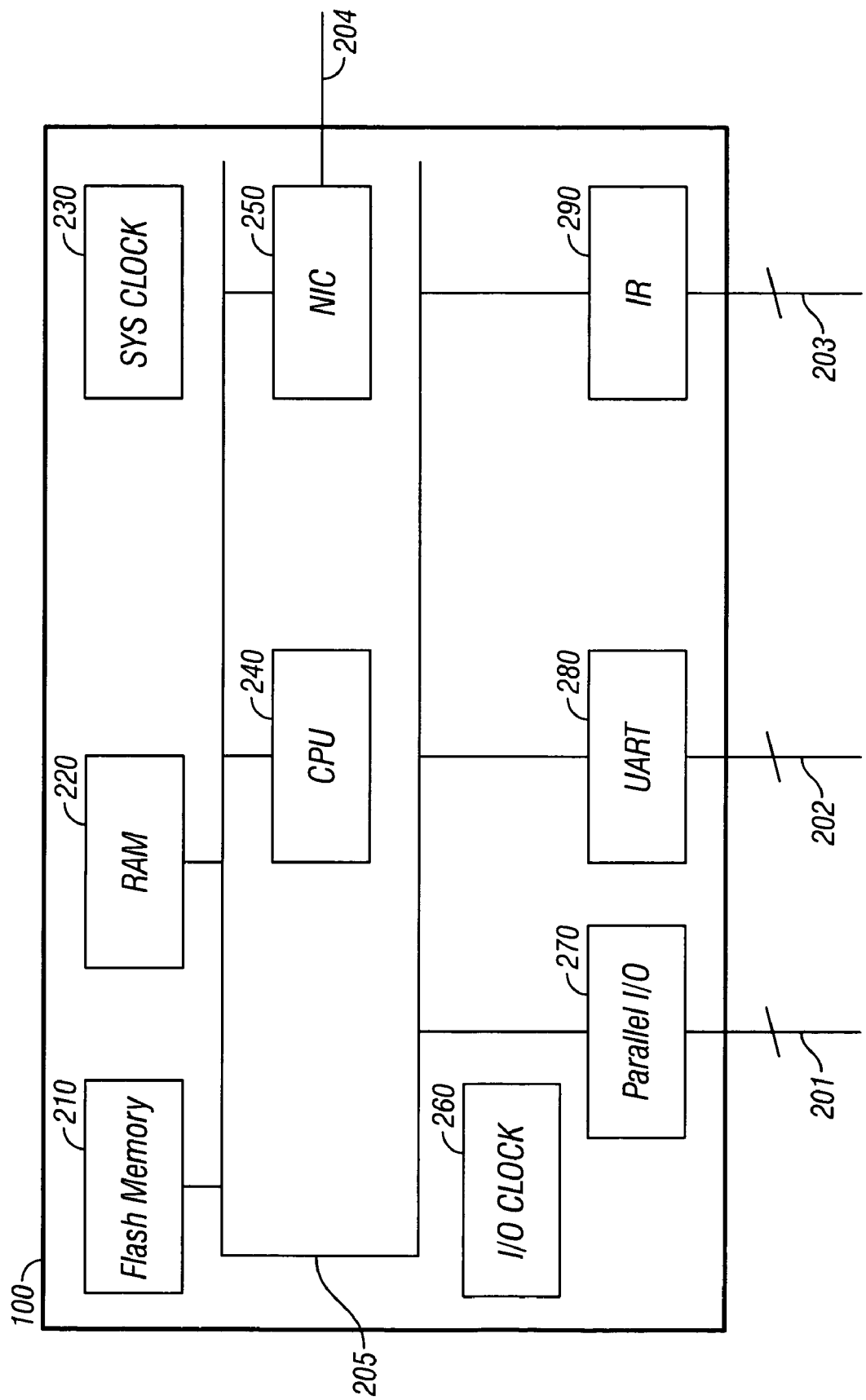
FIG. 2 is a top level block diagram of the web-serving device 100 in accordance with an embodiment of the present invention.

FIG. 2 is a top level block diagram of the web-serving device 100 in accordance with an embodiment of the present invention. In this illustration, web-serving device 100 includes Central Processing Unit (CPU) 240 as the main system processor communicating to all the internal functions through system bus 205. Device 100 further comprises non-volatile memory such as Flash Memory 210 for storage of system software, e.g., device drivers and other software requiring storage in non-volatile memory. Device 100 may also include volatile memory such as RAM 220 for processing. System clock 230 may include an internal oscillator for providing all the clocks required for operation of device 100. System clock 230 may also provide a real-time clock function. The real-time clock may be programmable to provide operating alerts, sequencing, and automatic monitoring. For instance, a real-time clock with a calendar may provide the capability to routinely check the status of the electronic equipment connected to device 100.

Figure 11A:
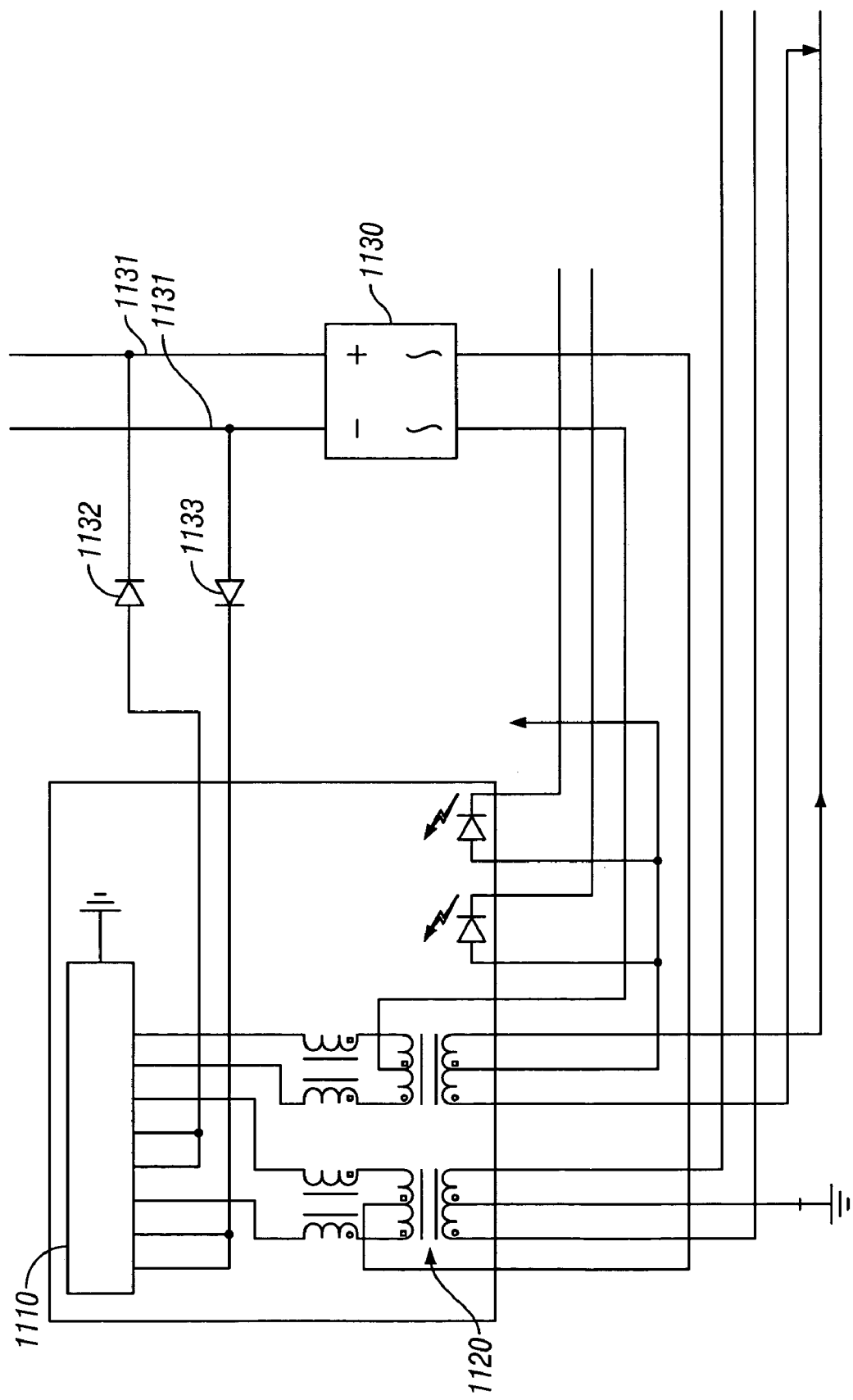
FIGS. 11A and 11B is an illustration of a power scheme in accordance with embodiments of the present invention.
Figure 11B:
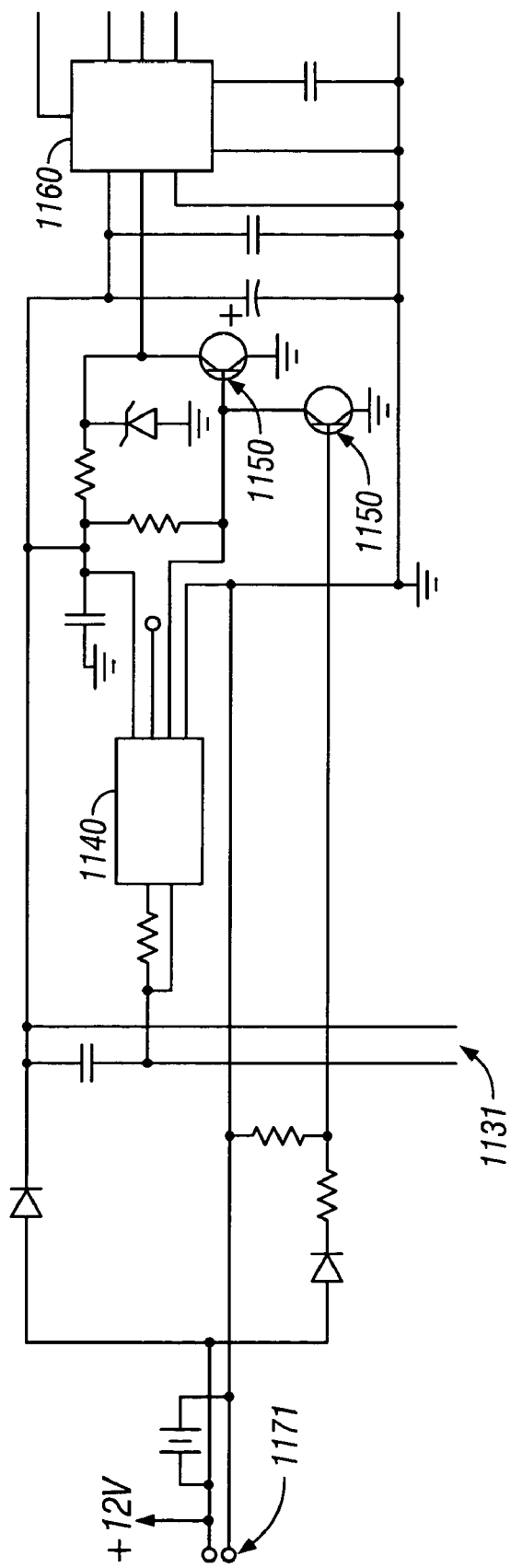

Device 100 may be equipped to receive power from the LAN in accordance with IEEE 802.3af, from a local power supply, or a combination of both LAN power and local power. The IEEE 802.3af standard has two basic modes for power over Ethernet. One mode is the Mid-Span mode where the extra pair in a 100 Mbps cabling to send 48 Volts down the line. The other mode is the End-Cable mode where 48 Volts is sent down the same line as data signals, which are AC-Coupled. FIG. 11 (A and B) is an illustration of a power scheme in accordance with embodiments of the present invention.

In this illustration, an embodiment of device 100 is connected to an Ethernet network via connector 1110, which may be an Rj-45 type connector. In the end-cable mode, the signal lines are passed through isolation elements 1120, e.g., transformers and also through bridge rectifier 1130 to provide 48 Volt DC at lines 1131. Alternately, the invention may receive power in the Mid-Span mode from the extra two pins of the 100 Mbps cabling through diodes 1132 and 1133 to provide 48 Volts DC at lines 1131. The network may be protected by forward biased diodes that prevent any power feedback to the network.

The power from lines 1131 feeds to signature detector 1140. Signature resistor 1140 provides signature resistance such that power is provided to device 100 when upon detection of the proper power signature. This also provides for backward compatibility with networks without IEEE 802.3af compatible power. Thus, device 100 will not turn on if the proper power signature is not detected on the network lines by detector 1140.

When proper power signature is detected by detector 1140, it turns on switching transistors 1150 which turns on regulator 1160. Regulator 1160 provides the necessary power, e.g. +5 volts, to run powered components of device 100.

Power to device 100 may also be provided using independent power supply into pins 1171. In this illustration, a +12V supply is provided at pins 1171 to alternatively power device 100. When power is provided through pins 1171, the state of transistors 1150 determine which power source device 100 is powered from. Thus, an embodiment may provide use of an independent power source when proper network power is unavailable.

Referring back to FIG. 2, Device 100 may be implemented as a scalable server with various types of configurable input/output ports. For instance, device 100 may include parallel I/O controller 270 for connection to external electronic devices through flexible port 201; serial interface controller UART 280 for communication through port 202 with external devices having serial communication capability; infrared output controller IR 290 for communication with external devices with IR capability through port 203; and network interface controller NIC 250 for communication with an IP network, such as the Internet, via port 204. I/O Clock 260 may provide any necessary clock signals to drive the I/O controllers in accordance with any required standards.

Serial Input/Output

In one or more embodiments, Serial port 202 provides bi-directional communication with external devices. Serial port 202 may comprise one or more nine-pin D-sub serial ports and/or captive screw terminal serial ports for flexible connectivity to a variety of equipment. A nine-pin D-sub serial port offers RS-232, RS-422 and RS-485 compatibility, while a captive screw terminal typically supports RS-232 communication. Serial port 202 may be configured for various modes. For instance, port 202 may be configured for a "pass-through" mode that provides the capability to pass through commands from an existing control system and to control and monitor a connected device. For instance, device 100 may connect to an A/V system through one or more of the serial ports for monitoring and control while maintaining the ability to use a local control system (e.g., remote control).

In one or more embodiments, configuration of serial port 202 is configurable through control of transceiver UART 280. The transceiver could be a device such as the SP3232E, SP522, SP50x series, etc, from Sipex Corporation; the MAX232, MAX483, etc, from Maxim; and other suitable Transceiver devices. A suitable transceiver may be one that is programmable to accommodate several protocols thus allowing for configurability through a web browser. Note that other suitable transceivers may be configurable through jumpers and/or software.

FIG. 3 is an illustration of a graphical user interface for configuring the serial port transceiver. The graphical user interface may be presented as a forms-based web page. When a user selects a given parameter value from the web page (e.g., baud rate of 9600 bps), the web browser at the web access station transmits this parameter value back to device 100 (e.g., using URL encoding) where a control register for the serial port transceiver is set accordingly. In this illustration, the graphical user interface provides for selection of port type (e.g. RS-232, RS-422, and RS-485), baud rate, number of data bits, parity (even/odd), number of stop bits, and flow control (XON/XOFF).

Flexible I/O Ports

In one or more embodiments, device 100 may be configured with one or more Flex I/O ports 201. Each flexible port can be configured as analog in, digital in or digital out. Each port may also be configured to support a large range of signal magnitude. For instance, a flexible I/O port capable of supporting digital and analog signals from 0 to 24 volts provides a voltage range suitable for controlling and/or monitoring a wide variety of equipment.

The ports can be configured to receive analog voltages from devices such as photo sensors, level feedback devices, strain gauges, thermocouples and variable potentiometers. In one embodiment, any incoming voltage signal is sampled with a high resolution analog-to-digital converter. The digitized voltage is then provided to processing unit 240 for further action (e.g., to be stored in an internal register for comparison or transmission as necessary for the specific application). For example, a voltage threshold may be set and when the threshold is past, device 100 may be configured to send out a serial command or e-mail message, or to trigger another event. In another example, a thermal sensor installed in an equipment rack may be connected to one of the Flex I/O ports 201. Device 100 may be configured to turn on auxiliary cooling fans and/or send an e-mail if the rack temperature exceeds a specific temperature. The trigger temperature may be implemented as a register value configured via forms in a web page provided by device 100.

When configured as digital inputs, Flex I/O ports 201 may connect to switches, sensors (e.g., moisture, motion, etc.), and other similar digital devices to provide feedback to device 100. This configuration may provide the ability to receive status from a variety of devices such as projector lifts, motorized projection screens, room partition switches, and push buttons.

When configured as digital outputs, Flex I/O ports 201 may drive LEDs, incandescent lamps, and other devices. For example, applications that require contact closure control may interface, with Flex I/O ports 201 through a relay box. Thus in operation, Flex I/O ports 201 may energize a relay to provide loop closure.

Figure 5:
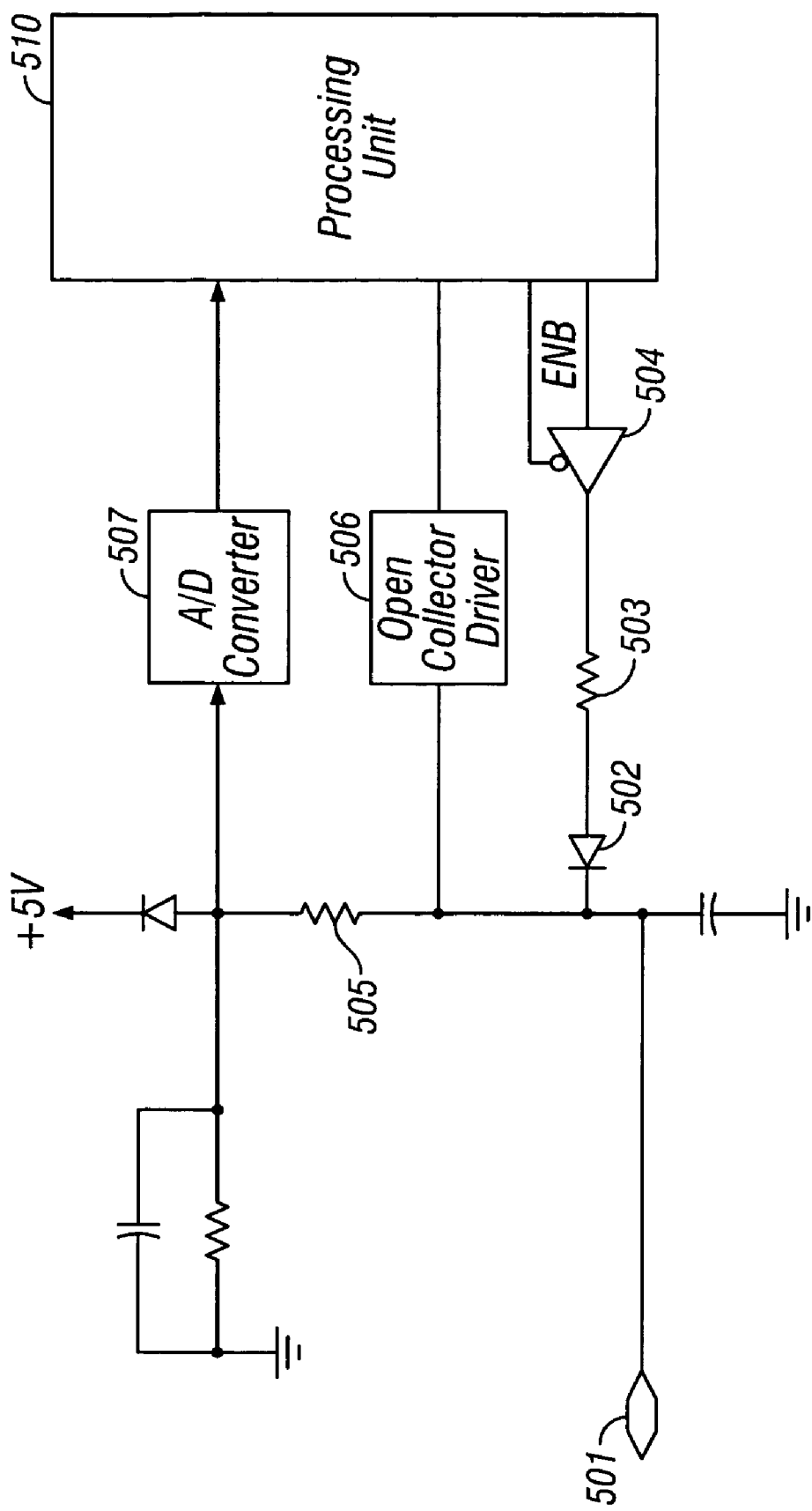
FIG. 5 is a circuit schematic illustrating the configurability of the Flex I/O ports in accordance with one embodiment of the invention.

FIG. 5 is a circuit schematic illustrating the configurability of the Flex I/O ports in accordance with one embodiment of the invention. When configuring port 501 as a digital output port, the user may set configuration parameters using the browser interface as shown in FIG. 4, for example. Those configuration parameters set appropriate registers in Processing Unit 510, which can then be used to drive, directly or indirectly, switches or gates enabling specific circuitry for the specified configuration. Processing Unit 510 could be a device such as an FPGA (Field Programmable Gate Array), a microcontroller, or other similar device.

Configuring port 501 to digital output mode involves the Processing Unit 510 enabling programmable pull-up resistor 503 and diode 502. To generate output high, the Processing Unit enables the signal line to tri-state buffer 504 thereby removing the buffer out of tri-state mode and driving pull-up resistor 503 high. To generate the output low, an open collector output driver 506 is set to low impedance mode by Processing Unit. Note that driver 506 is an open collector output device that pulls to ground with very low impedance. The characteristic of open collector output driver 506 is that its output goes to high impedance when off thus behaving as an unconnected device. Open collector output driver 506 may be implemented with a device such as ULN2003A from STMicroelectronics.

Configuring port 501 to input mode, analog or digital, involves the Processing Unit setting open collector output driver 506 to high impedance state (i.e. off), and setting tri-state buffer 504 to the off mode. Thus, the primary impedance between input port 501 and analog-to-digital (A/D) converter 507 is resistor divider 505. Resistor divider 505 scales the input voltage to an appropriate value for A/D converter 507.

FIG. 5 illustrates one possible embodiment of circuitry for providing configurable Flex I/O ports. It will be understood that other circuitry configurations may be used to provide an equivalent configurable I/O port within the scope of the invention.

Infrared Ports

Embodiments of Device 100 may include one or more fully programmable IR ports. Each IR port may be capable of outputting IR signals with or without the carrier signal using a wired IR emitter or through an IR broadcaster. Device 100 is capable of collecting IR control data in various ways such as file download and IR learning. IR data may be downloaded from a variety of sources for a variety of devices for storage in device 100.

IR data, such as timing information, may be stored in First-In-First-Out (FIFO) buffers in Processing Unit 510. A state machine in Processing Unit 510 may then cycle through the buffer to generate a modulated signal. The modulated signal may be clocked the I/O Clock 260 (FIG. 2). I/O clock 260 may be a device such as a Sixty Six (66) MHz master clock crystal thereby providing for generation of multiple carrier frequencies using clock divider. Thus, it is possible to provide IR control for a variety of equipments with the present invention.

Also stored in Processing Unit 510 is the number of cycles of a carrier frequency to put out in bursts to the equipment under control. The output signals may then be passed through transistors (e.g. FET) to drive cables having IR emitters.

Device 100 may also include the ability to learn IR commands for virtually any IR controllable device. A simple and easy IR learning process may be implemented using an IR remote provided with a device. Embodiments of the invention may also associate specific serial command strings with specific IR commands. The IR learning capability allows a multitude of devices with legacy interfaces to be easily adapted to today's high-speed LAN communication systems.

Network Interface

Embodiments of Device 100 use industry standard Ethernet communication protocols, such as ARP, DHCP, ICMP (ping) TCP/IP, Telnet, HTTP, and SMTP to provide a web interface to a user for monitoring, controlling and scheduling of equipment connected to device 100. Embodiments of device 100 provide the capability to write and upload scripts that automate some functions. For example, the user may want to control some electronic equipment based on assignable criteria such as turning connected equipment on or off at predetermined times and alerting individuals if an attached unit is stolen or goes offline.

Multiple users may simultaneously connect to device 100 enabling support of many concurrent users. Device 100 improves system throughput by sending information to all the users in parallel. Further, because device 100 can be used to monitor and control multiple pieces of equipment simultaneously, configuration and monitoring are simplified, and less network traffic is created than would be the case for a system in which each piece of equipment is required to be monitored and controlled separately.

Various levels of security with password protection may be included in some embodiments of the invention. For instance, a "User" access level may authorize limited entry to only pre-designated functions, while an "Administrator" access level permits full access to advanced settings.

Device 100 includes a Generalized Graphical User Interface, which serves as an asset management tool by allowing the user to identify and monitor all electronic equipment connected to each of one or more web-serving devices 100 in the system. The user can configure the web-serving devices 100 for control of the equipment through the Generalized Graphical User Interface interface.

Users can implement driver packages containing all data and control functionality for a specific piece of equipment or create their own drivers. Once the pieces of equipment are identified and configured, the user can view the status of all equipment via a web browser. Each Ethernet-enabled device 100 will have a unique IP address with links tied through the Generalized Graphical User Interface device list. The user simply clicks on an icon representing the chosen device in the system. To assist in the configuration process, the Generalized Graphical User Interface may contain context sensitive help, which provides information specific to the page being configured.

Figure 6:
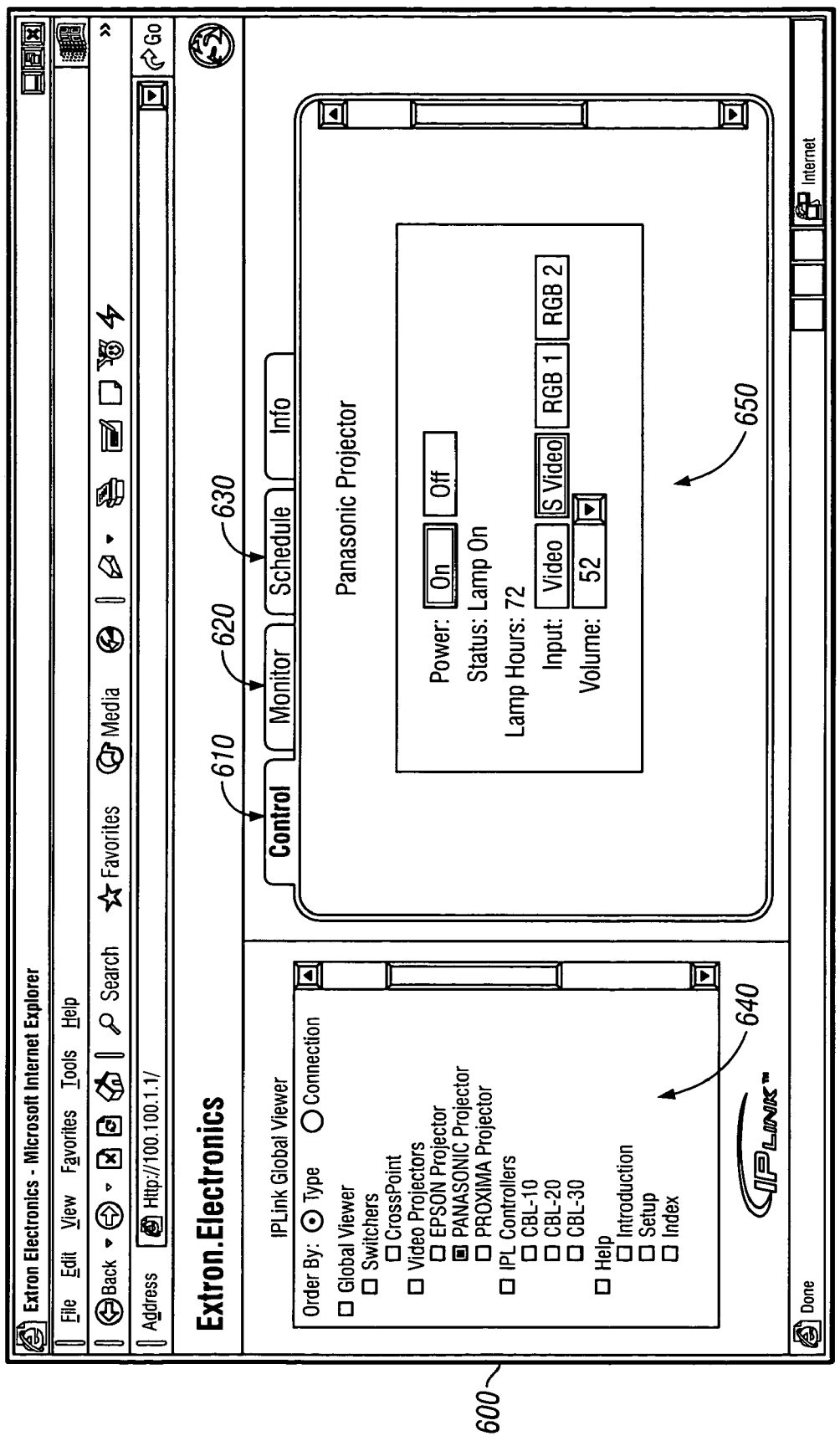
FIG. 6 is an illustration of an example Generalized Graphical User Interface in accordance with an embodiment of the present invention.

FIG. 6 is an illustration of an example Generalized Graphical User Interface in accordance with an embodiment of the present invention. In this illustration, Generalized Graphical User Interface 600 has various tabs that enable a user to access, control (e.g., tab 610), monitor (e.g., tab 620), and schedule (e.g., tab 630) electronic equipment (e.g., A/V products) connected to device 100.

Generalized Graphical User Interface 600 may be customized to provide a centralized management center for all equipment connected to various web-serving devices 100 in an environment such as a school, or all around the world. In such a case, window 640 may provide a tree-type selection approach for each device 100 and its connected electronic equipment. Window 650 provides a customizable web page that may be tailored to meet specific needs and provide the desired functionality for each piece of equipment. Each web page 650 may be dynamically created using "server-side include" functionality. The "server-side include" function parses HTML command lines and includes the desired information in the web page sent to browser 600. The "server-side include" function is described in detail below.

The Generalized Graphical User Interface and the Ethernet-to-serial interface capability of the present invention provide a necessary functionality for asset management. With its polling and e-mail capabilities, which allows a user to program device 100 to continually monitor the status of one or more equipments connected to it and provide notification to a user (e.g., via e-mail) when a certain condition is met, device 100 can quickly alert users to security breaches. Also, by having access to all network-connected equipment, users can determine which devices are used most frequently and allocate resources based on need.

Figure 7:
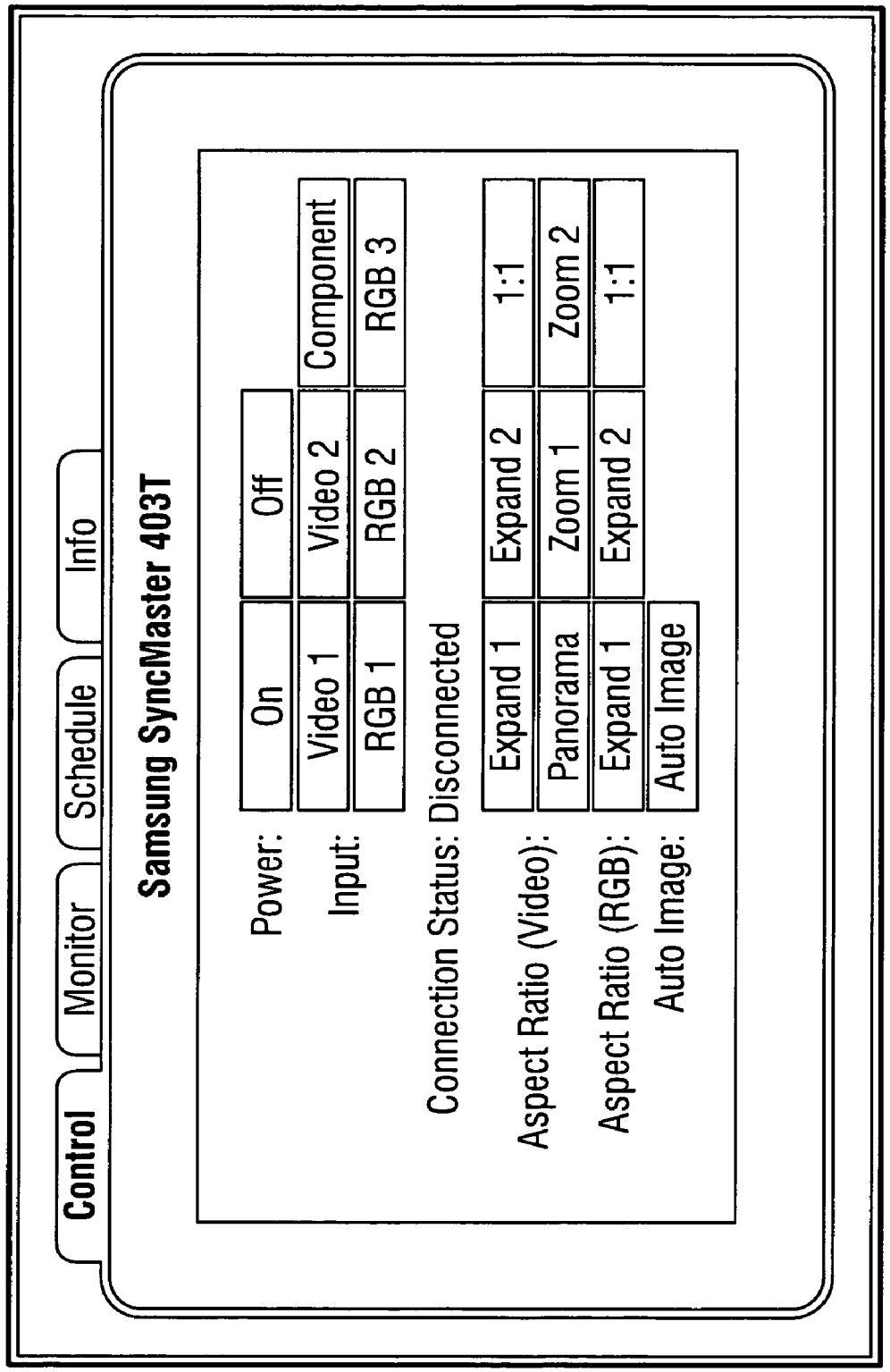
FIG. 7 is an example web page that may be created for control of a Samsung™ LCD monitor.

To allow for the individual needs of each environment, the software interface can be customized to display an equipment's status in any number of ways. For instance, color-coded buttons may signal power on or off, or bar graphs may show maximum amount of lamp hours vs. hours used. Users can also create their own look and feel by including a logo or marketing message using HTML, Flash animation, JavaScript, and more. FIG. 7 is an example web page that may be created for control of a Samsung™ LCD monitor. In this illustration, a user is able to select functions such as power on/off, video input source selection, and resizing of the viewing area.

Figure 8:
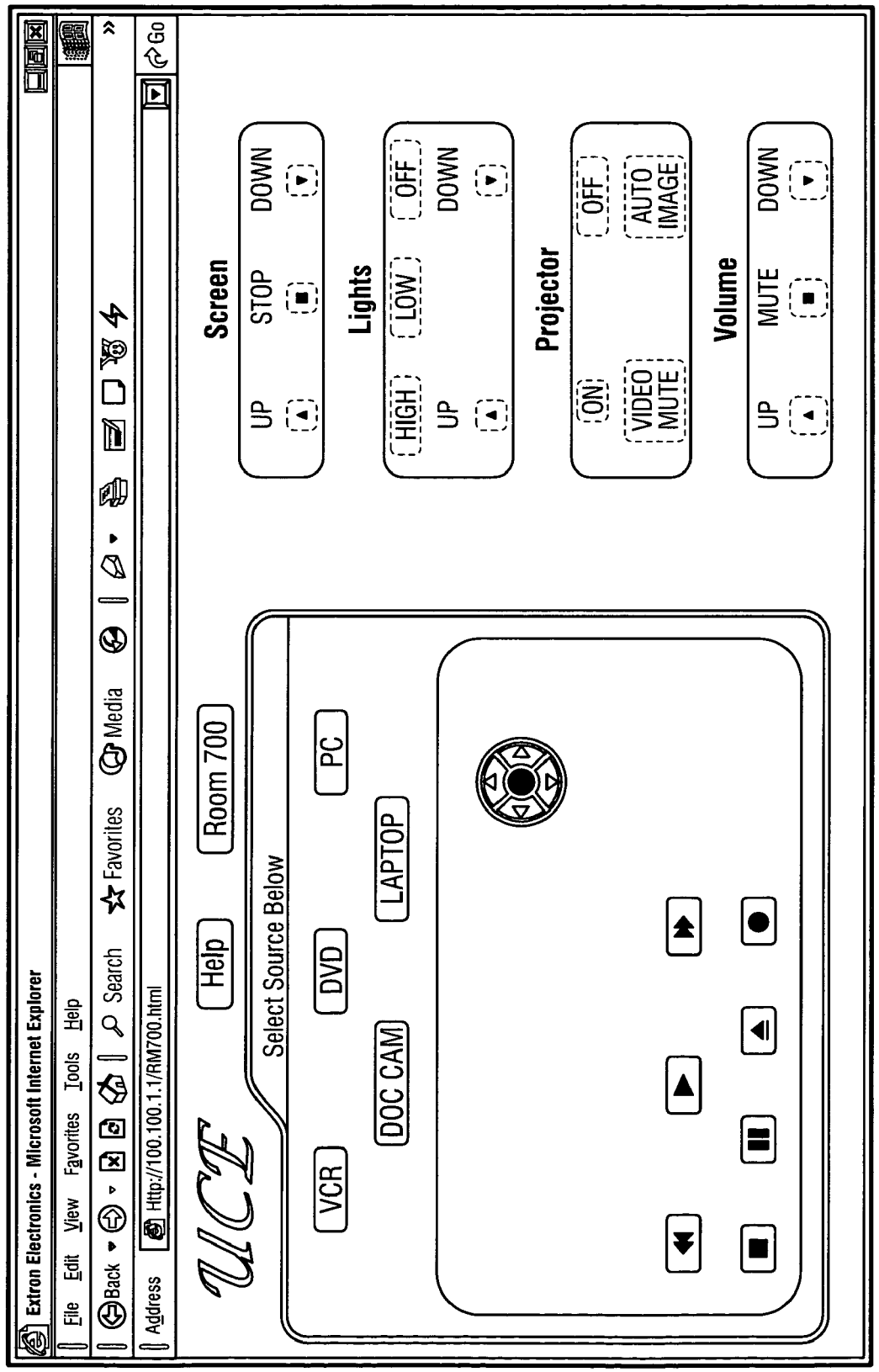
FIG. 8 provides another illustration of a web page associated with the control functionality.

FIG. 8 provides another illustration of a web page associated with control tab 610. A user is provided with the ability to view and manipulate such basic functions as volume, mute, video inputs, power, and other functions of A/V equipment (e.g., a projector). In this illustration, a user can remotely control equipment such as a VCR, DVD, PC, Document Camera, laptop, etc., using the control buttons provided on the web page. For instance, there are buttons for "Play", "Fast Forward", "Rewind", "Pause", "Stop", etc. The basic control system (e.g., remote control) of each piece of equipment remains functional while a user is provided the added functionality of controlling all of the equipment from anywhere in the world.

Figure 9:
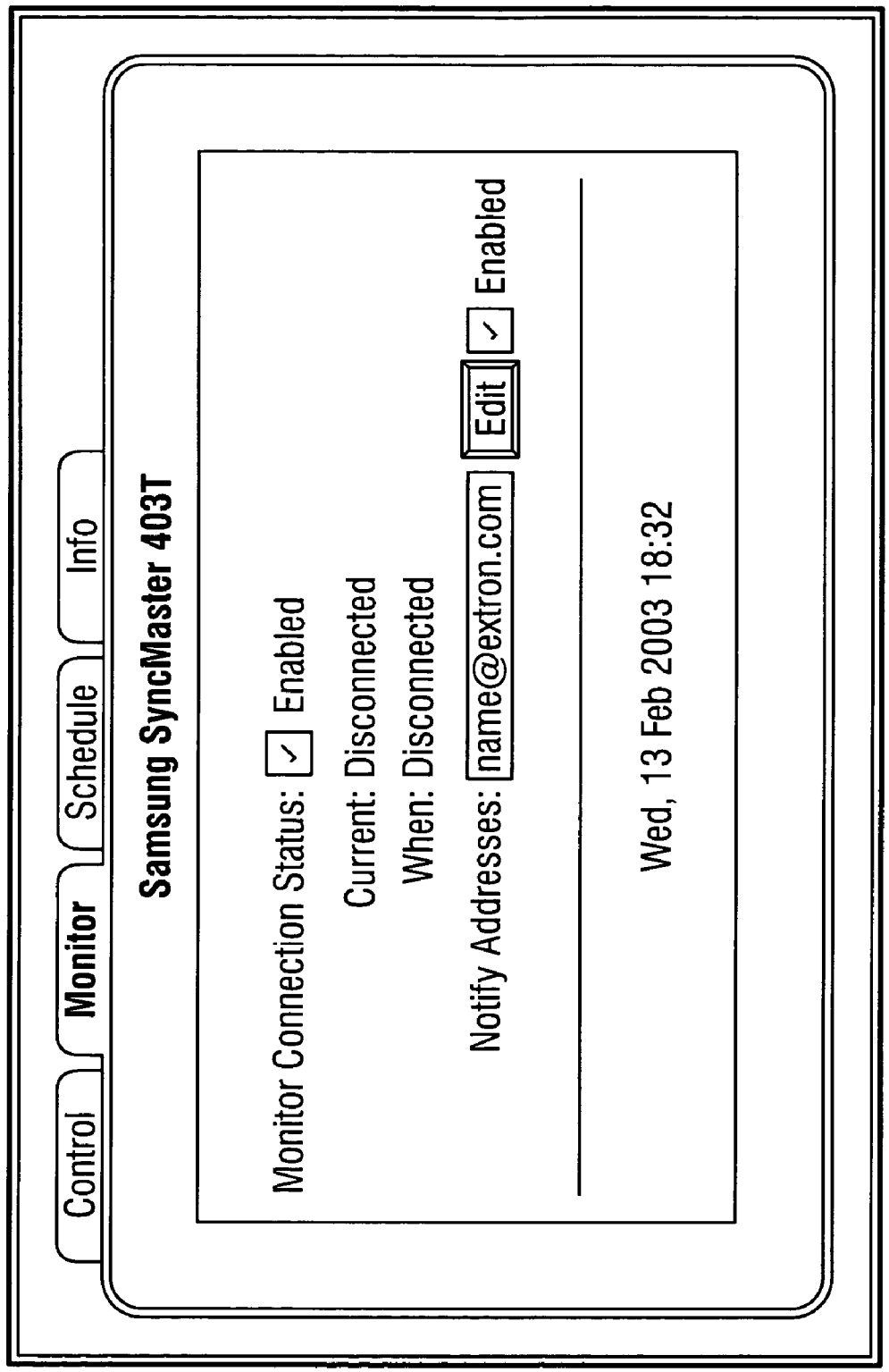
FIG. 9 is an illustration of a monitor web page for the Samsung™ SyncMaster monitor.

A monitor web page provides a user the ability to view status functions of a product. For example, a user can poll the lamp hours of all connected projectors, even if the projector does not have a built-in lamp timer. With projectors and other devices without a built-in timer, device 100 may monitor the ON and OFF times by either controlling the power switch or sensing the change in current, for example. The device may also be programmed to notify a user by e-mail. For example, FIG. 9 is an illustration of a monitor web page for the Samsung™ SyncMaster monitor. In this illustration, device 10 is configured to notify the user by e-mail when the equipment is disconnected.

Figure 10:
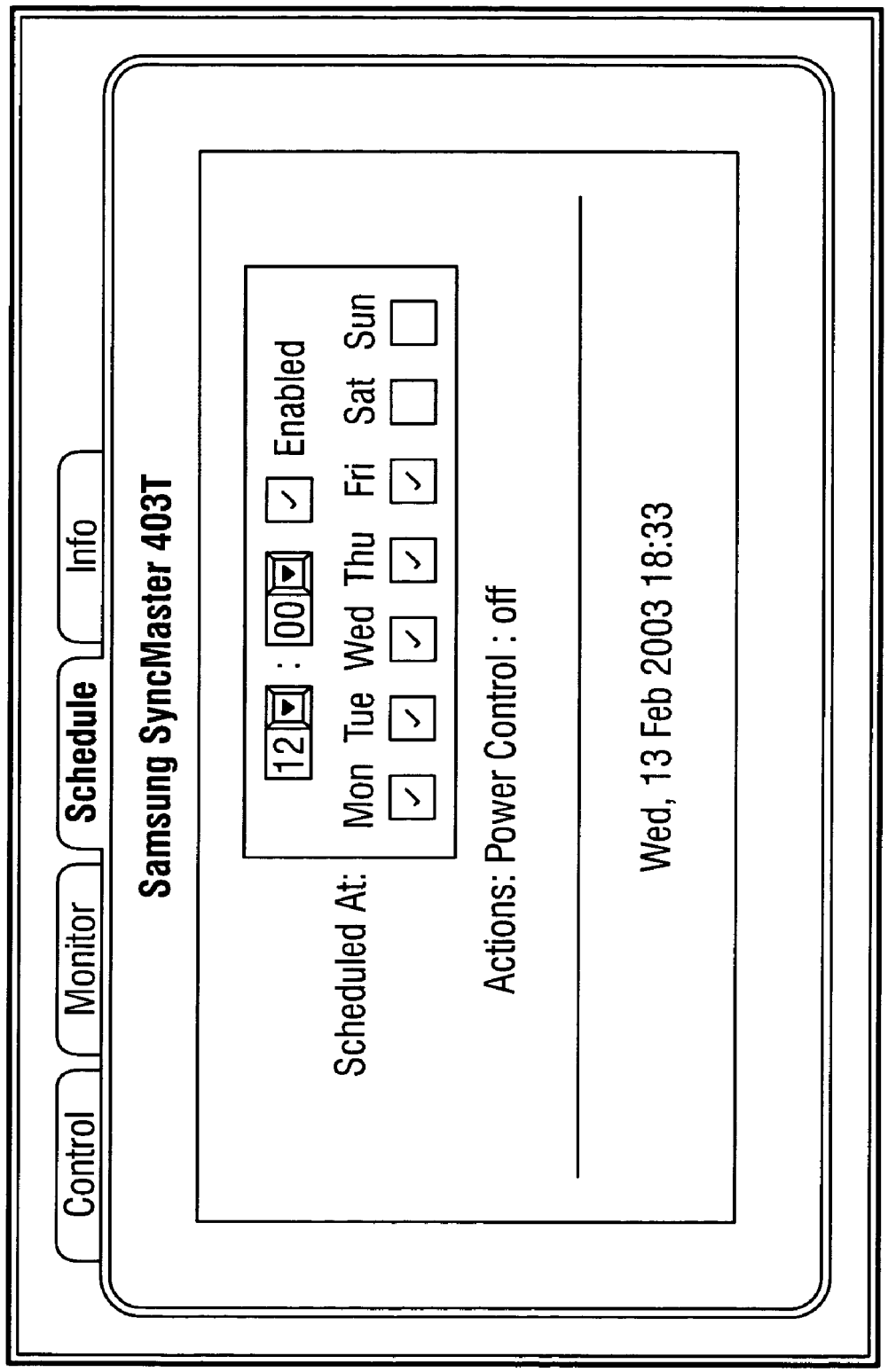
FIG. 10 is an illustration of a scheduling web page for the example Samsung™ SyncMaster monitor.

In another example, a scheduling web page (e.g., associated with the schedule tab of the Generalized Graphical User Interface) may provide the ability to control devices over time. For instance, FIG. 10 is an illustration of a scheduling web page for the example Samsung™ SyncMaster monitor. In this illustration, the monitor is scheduled to power off Monday through Friday at 12:00 noon. This information may be passed to device 100 where it may be stored in registers or other memory associated with monitoring the specified piece of equipment.

In a typical application, a technician at an educational facility with several classrooms may need access to control, monitor, and troubleshoot the school's A/V equipment from a single location on campus. Using the Generalized Graphical User Interface software, the technician can program one or more web-serving devices (100) to track the projector lamp hours in each classroom and generate an e-mail alert at 1,350 hours, well before each projector lamp's expected life maximum of 1,500 hours. The technician may set up the device so that alerts can be received by e-mail via a computer, cell phone, PDA, or pager. With timely information regarding lamp life, the technician can then order and replace the lamps before the existing ones burn out. In addition, the technician can configure the projectors to power on or off at pre-selected times, and each device can be automatically monitored for its connection to the LAN. Thus, the present invention helps minimize downtime because equipment may be proactively serviced.

Configuring Device Web Page

Each device web page may be configured dynamically. A user may program device 100 to dynamically obtain device and/or equipment status when a web page is requested by a web browser. Requests from the web browser may be sent to device 100 via URL encoding or other transfer mechanism. Upon receiving the request, device 100 parses the request to determine what information is requested, or what action to take.

For instance, a user may want to reset the counter for Lamphours for a particular projector connected to device 100. The user may send the command to reset the counter by pressing a button on the browser that says "Reset Lamphours", for example. The browser sends the command "<IP-ADDRESS>/<Name_Page>?Lamphours=0". Upon receiving the command, device 100 parses the command, obtains the variable "Lamphours" and the value of "0", then sets the corresponding register value in memory to "0".

Web pages may be built dynamically because information for each device may be obtained by the appropriate HTML command line. For instance, the following command will retrieve the desired information, using a "server-side include" function, and send the data back to the web page.

typeArray[1]='<!—#echo var="W1CY|"—>';

Device 100 parses this HTML command line, retrieves information represented by "W1CY" and returns the web page with the retrieved information to the web browser.

Processing of and dynamic creation of web pages are very fast because, in one or more embodiments, device 100 uses a flattened network stack instead of the traditional seven layer OSI (International Standards Organization) stack, when receiving network traffic. A flattened stack allows for faster processing of network traffic to determine if the information contained in the traffic is of interest to device 100. The flattened stack approach treats the data as one long piece of flattened data. By contrast, the seven layer model requires processing at various layers before the actual data is retrieved at the seventh layer (i.e. the Application Layer). A flattened stack allows one to immediately check the first one or two bytes of data to determine and obtain information of interest to device 100 without the added burden of processing in the previous six network layers.

Figure 13:
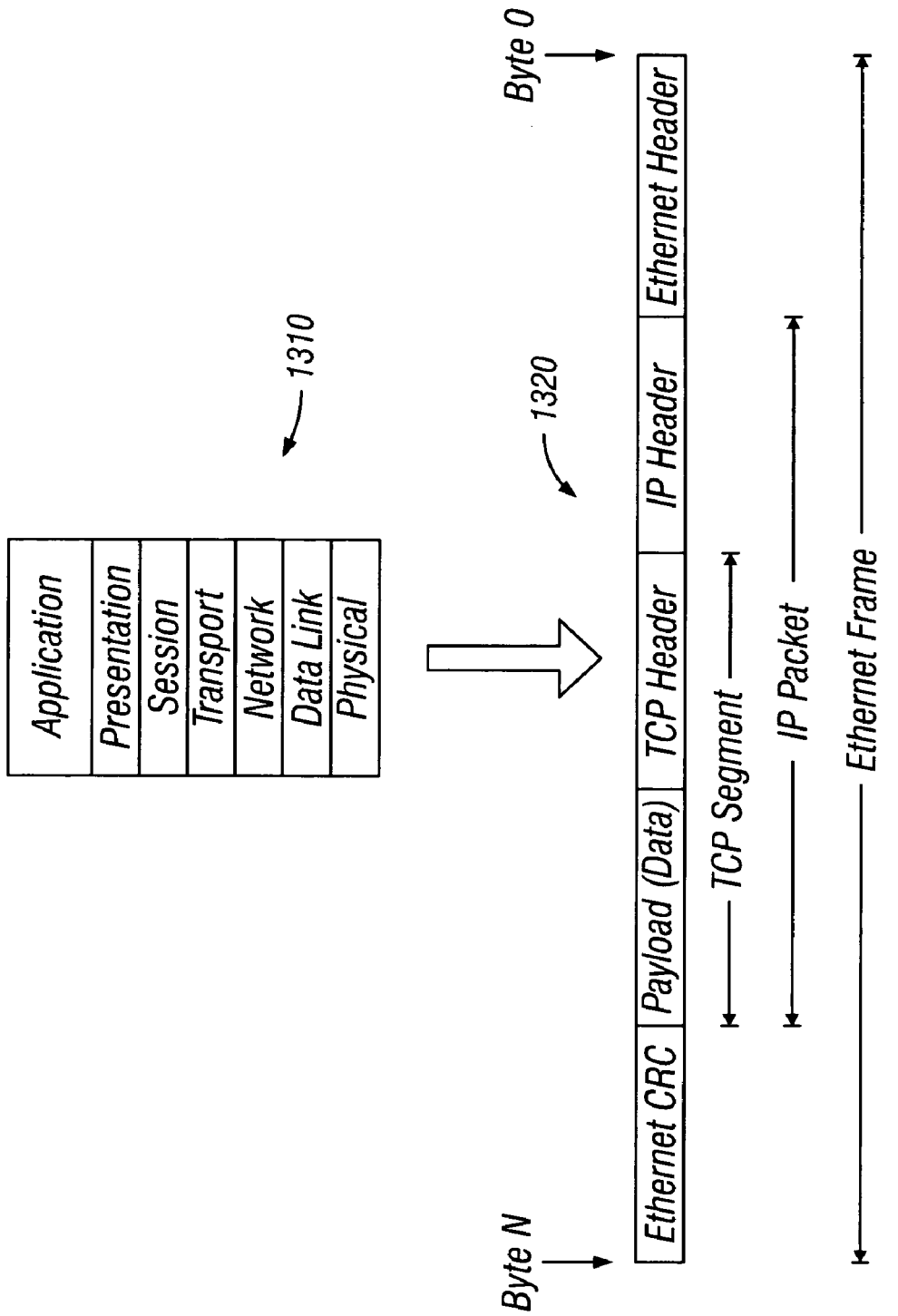
FIG. 13 is an illustration of the flattened stack in accordance with embodiments of the present invention.

FIG. 13 is an illustration of the flattened stack in accordance with embodiments of the present invention. The flattened stack, which may be implemented in either hardware or software, arises from the need to eliminate redundant processing in device 100. The OSI seven layer model 1310 is replaced with a flattened stack 1320 for processing. The Ethernet packet arrives in the following segments (frames), from Byte 0 through Byte N, with the Ethernet Header; followed by the IP Header; followed by the TCP Header; the Payload (or Data); and finally the Ethernet CRC (Cyclic Redundancy Checking) frame.

Normally, prior art systems will receive the Ethernet packet and process the Ethernet frame, then process the IP packet, then process the TCP segment, before the packet is passed to the Application layer. The Application layer then checks if the application data is valid and needed. If the data is valid and needed, it will be processed, otherwise it will be dropped. Thus, needless processing is performed before the decision to drop unneeded data is made. This is possible because the lowest layer of the OSI stack has knowledge of what applications are active in the upper layers. Thus a flattened stack allows the packet to be discarded at the earliest possible point so no processing power is wasted. The flattened stack implementation organizes its check/processing based on the raw data stream thus minimizing buffer requirements and providing for easier implementation into hardware.

Figure 14:
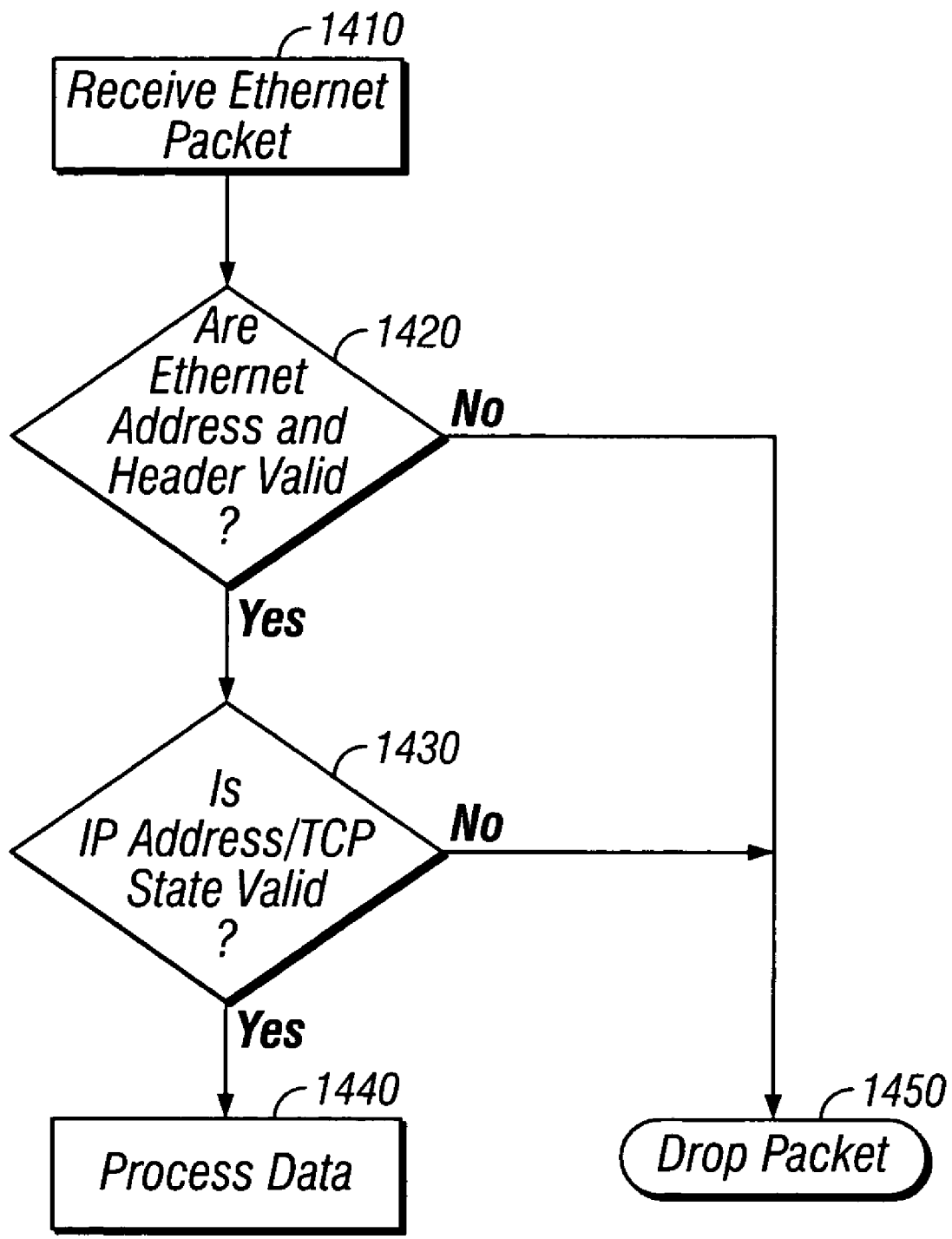
FIG. 14 illustrates reduction processing of Ethernet packets by making the drop/process decision immediately using the flattened stack approach, in accordance with embodiments of the present invention.

Embodiments of the present invention reduce the needless processing by making the drop/process decision immediately as illustrated in FIG. 14. The Ethernet packet is received in block 1410. At block 1420, the Ethernet Address and Header are checked for validity. If the Ethernet address and header are not valid, the packet is dropped immediately at Block 1450. Otherwise, if the IP address and header are valid processing proceeds to block 1430. At block 1430, the IP Address and TCP state are checked for validity. If the IP address and TCP state are not valid, the packet is dropped immediately at Block 1450. Otherwise, if the address and header are valid processing proceeds to block 1440 where the data is processed.

Figure 12:
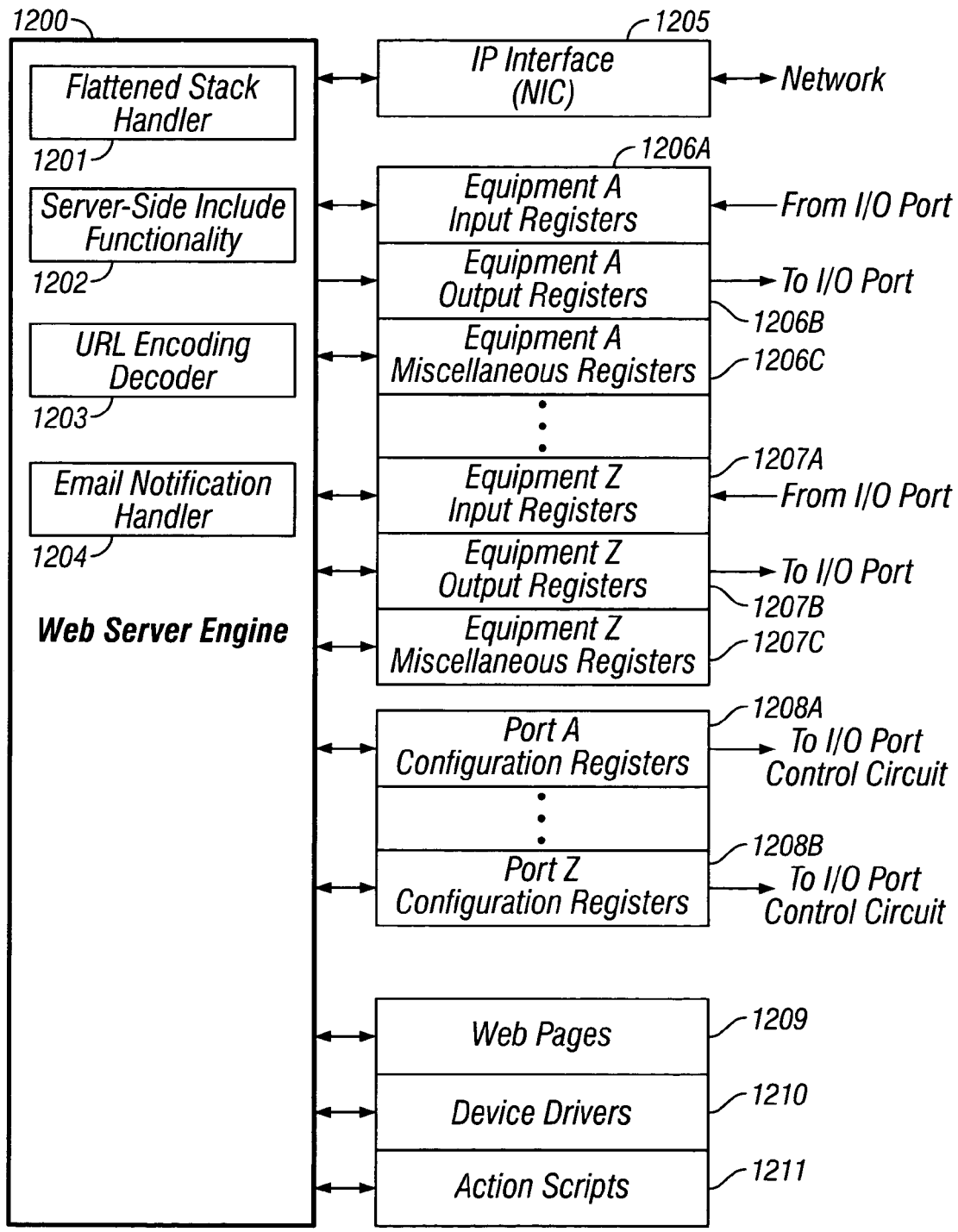
FIG. 12 is a block diagram illustrating, in accordance with an embodiment of the invention, a firmware/software configuration of a web server device that may be implemented using the CPU and memory hardware previously described.

FIG. 12 is a block diagram illustrating, in accordance with an embodiment of the invention, a firmware/software configuration of a web server device that may be implemented using the CPU and memory hardware previously described. Web server engine 1200 may be implemented using software stored in memory and executed by a processor, firmware stored in ROM (or EPROM or any other ROM-variant circuit), logic implemented with application specific circuits, logic implemented in a programmable circuit such as a field-programmable gate array (FPGA), or any combination of the foregoing. Registers 1206A-1206C, 1207A-1207C and 1208A-1208B may be implemented as memory locations in RAM or as register locations in a processing unit (e.g., a microprocessor). Blocks 1209-1211 may be implemented with RAM, though default web pages, drivers and action scripts may also be stored in ROM. IP interface 1205 is implemented by the circuitry used to provide communication with the IP network (including wired or wireless support).

Web server engine 1200 comprises flattened stack handler 1201, "server-side include" functionality 1202, URL encoding decoder 1203 and e-mail notification handler 1204. Flattened stack handler 1201 provides the mechanism for inserting and extracting application level information into transmitted IP packets and out of received IP packets. The use of a flattened stack allows the web server engine to respond to web service requests much faster than conventional web servers.

"Server-side include" functionality 1202 implements the generation of web pages for transmission to a requesting web browser. This web page generation may be achieved through the insertion of HTML (or related hyper-text language) information into an HTML file (e.g., a web page from storage block 1209) using "server-side include" command structures, as described previously.

URL encoding decoder 1203 extracts commands and data inputs from received http requests, and initiates execution of the given command or writes the extracted data value to the identified register. URL encoding is described in more detail in a previous section of this specification.

E-mail notification handler 1204 responds to scripted or otherwise scheduled monitoring tasks to construct and send an e-mail message to specified e-mail addresses when a specific event occurs or a designated time interval elapses. The email addresses may be stored, for example, within registers associated with a given piece of equipment (e.g., miscellaneous equipment registers 1206C and 1207C), or in general registers associated with the web-serving device itself (not shown). The email notification may be sent over the IP network, or it may be transmitted over another output port of the web-serving device, such as a serial port.

Equipment A input registers 1206A and equipment Z input registers 1207A may be used to store the input received from an I/O port associated with the given piece of equipment being monitored and controlled by the web-serving device (note that the equipment could be another web-serving device). Such input may be digital input representing the status of a piece of equipment (e.g., lamp is "on" or "off"), or it may be the digitized input received from the analog-to-digital converter of a flexible I/O port configured for analog input. Web server engine 1200 may read the input register as directed by, for example, a corresponding action script or device driver.

Equipment A output registers 1206B and Equipment Z output registers 1207B may be used to store digital data to be transmitted over one of the output ports. Such output data may include, for example, control and configuration data associated with the performance of an attached piece of equipment. Web server engine may overwrite the stored output data as directed by an action script or commands received via URL encoding in an HTTP request. Further, the transmission of the output data through the output port may be performed in accordance with a device driver stored in memory block 1210.

Miscellaneous registers 1206C and 1207C may be used to store data values associated with the monitoring and control of corresponding equipment, where the data value itself does not need to be communicated to the equipment. For example, a timing interval for triggering a monitoring function may be stored in the miscellaneous registers, or a threshold value may be stored for comparison with a data value from one of the input registers (e.g., comparing a temperature sensor reading with a threshold value to determine whether a piece of equipment is active or on standby, or is overheating).

Configuration registers 1208A and 1208B may be used to store configuration data for the one or more I/O ports of the web-serving device. These values may include, for example, the baud rate and parity control bits for a serial port, or control bits for the I/O mode of a flexible I/O port (e.g., digital input, digital output, analog input (using an analog-to-digital converter), or analog out (using a digital-to-analog converter)).

As alluded to in the above description, memory block 1209 may be used to store web pages (subject to the server-side include functionality), memory block 1210 may be used to store device drivers loaded through the IP network, and memory block 1211 may be used to store action scripts for implementing controlling and monitoring functions.

Thus, a method and apparatus for providing universal web-access functionality have been described. Although the present invention has been described with respect to certain specific embodiments, it will be clear to those skilled in the art that the inventive features of the present invention are applicable to other embodiments as well, all of which are intended to fall within the scope of the present invention.

What is claimed is:

1. An apparatus for providing universal web access functionality comprising:
   a first electronic device having a plurality of configurable Input/Output ports;
   a network connection to said first electronic device on a first one of said plurality of configurable Input/Output ports;
   at least one second electronic device connected to said first electronic device on a second one of said plurality of configurable Input/Output ports, wherein said first electronic device serves web pages associated with said at least one second electronic device, wherein configuration parameters for said second one of said plurality of configurable Input/Output ports are set using a browser interface to said first electronic device;
   a tri-state buffer, said tri-state buffer being removed out of tri-state mode and driving a pull-up resistor high to generate output high on at least one of said plurality of configurable Input/Output ports; and
   an open collector output driver, said open collector output driver being set to low impedance mode to generate an output low at said second one of said plurality of configurable Input/Output ports.

2. A method for providing universal web access functionality comprising:
   providing a plurality of configurable Input/Output ports on a first electronic device;
   connecting said first electronic device to a network via a first one of said plurality of configurable Input/Output ports;
   connecting at least one second electronic device to said first electronic device on a second one of said plurality of configurable Input/Output ports, wherein said first electronic device serves web pages associated with said at least one second electronic device;
   setting configuration parameters for said second one of said plurality of configurable Input/Output ports using a browser interface to said first electronic device;
   removing a tri-state buffer out of tri-state mode and driving a pull-up resistor high to generate output high at said second one of said plurality of configurable Input/Output ports; and
   setting an open collector output driver to low impedance mode to generate an output low at said second one of said plurality of configurable Input/Output ports.

3. An apparatus for providing universal web access functionality comprising:
   a plurality of configurable Input/Output ports for connection to at least one electronic device;
   a server engine serving web pages providing access to said at least one electronic device via said plurality of configurable Input/Output ports; and
   an interface device providing remote connectivity to said server engine via a network, wherein configuration parameters for said plurality of configurable Input/Output ports are set using said interface device;
   a tri-state buffer, said tri-state buffer being removed out of tri-state mode and driving a pull-up resistor high to generate output high on at least one of said plurality of configurable Input/Output ports; and
   an open collector output driver, said open collector output driver being set to low impedance mode to generate an output low on at least one of said plurality of configurable Input/Output ports.

4. The apparatus of claim 3, wherein said plurality of configurable Input/Output ports comprises analog Input/Output ports.

5. The apparatus of claim 3, wherein said plurality of configurable Input/Output ports comprises digital Input/Output ports.

6. The apparatus of claim 3, wherein said plurality of configurable Input/Output ports comprises an RS-232 port.

7. The apparatus of claim 3, wherein said plurality of configurable Input/Output ports comprises an RS-422 port.

8. The apparatus of claim 3, wherein said plurality of configurable Input/Output ports comprises an RS-485 port.

9. The apparatus of claim 3, wherein said plurality of configurable Input/Output ports comprises an infrared (IR) port.

10. The apparatus of claim 3, wherein said plurality of configurable Input/Output ports comprises general purpose Input/Output ports.

11. The apparatus of claim 3, wherein said interface device comprises a configurable graphical user interface.

12. The apparatus of claim 3, wherein said interface device comprises a network interface card.

13. The apparatus of claim 12, wherein said network interface card comprises an RJ-45 connector.

14. The apparatus of claim 12, wherein said network interface card comprises a wireless connector.

15. The apparatus of claim 3, wherein said at least one electronic device is not web enabled.

16. The apparatus of claim 3, wherein said server engine comprises:
   a flattened stack handler for processing an ethernet packet;
   a server-side include function;
   a URL encoder/decoder function; and
   an electronic mail notification handler.

17. The apparatus of claim 16, wherein said processing said ethernet packet comprises:
   receiving said ethernet packet comprising Ethernet header, IP header, TCP/UDP header, and payload; and
   processing said payload only if said Ethernet header, said IP header and said UDP/TCP header are associated with an active service at an application layer.

18. A method for providing universal web access functionality comprising:
   providing a plurality of configurable Input/Output ports for connection to at least one electronic device;
   providing a server engine serving web pages for access to said at least one electronic device via said plurality of configurable Input/Output ports;
   providing an interface device for remote connectivity to said server engine via a network;
   setting configuration parameters for said plurality of configurable Input/Output ports using said interface device;
   removing a tri-state buffer out of tri-state mode and driving a pull-up resistor high to generate output high on at least one of said plurality of configurable Input/Output ports; and
   setting an open collector output driver to low impedance mode to generate an output low on at least one of said plurality of configurable Input/Output ports.

19. The method of claim 18, wherein said plurality of configurable Input/Output ports comprises analog Input/Output ports.

20. The method of claim 18, wherein said plurality of configurable Input/Output ports comprises digital Input/Output ports.

21. The method of claim 18, wherein said plurality of configurable Input/Output ports comprises an RS-232 port.

22. The method of claim 18, wherein said plurality of configurable Input/Output ports comprises an RS-422 port.

23. The method of claim 18, wherein said plurality of configurable Input/Output ports comprises an RS-485 port.

24. The method of claim 18, wherein said plurality of configurable Input/Output ports comprises an infrared (IR) port.

25. The method of claim 18, wherein said plurality of configurable Input/Output ports comprises general purpose Input/Output ports.

26. The method of claim 18, wherein said interface device comprises a configurable graphical user interface.

27. The method of claim 18, wherein said interface device comprises a network interface card.

28. The method of claim 27, wherein said network interface card comprises an RJ-45 connector.

29. The method of claim 27, wherein said network interface card comprises a wireless connection.

30. The method of claim 18, wherein said at least one electronic device is not web enabled.

31. The method of claim 18, wherein said server engine comprises:
   a flattened stack handler for processing an ethernet packet;
   a server-side include function;
   a URL encoder/decoder function; and
   an electronic mail notification handler.

32. The method of claim 31, wherein said processing said ethernet packet comprises:
   receiving said ethernet packet comprising Ethernet header, IP header, TCP/UDP header, and payload; and
   processing said payload only if said Ethernet header, said IP header and said UDP/TCP header are associated with an active service at an application layer.

33. The method of claim 1, wherein said apparatus further comprises:
   registers set by said configuration parameters; and
   devices selected from a group consisting of switches and gates, said devices for enabling circuitry in accordance with the configuration parameters, said devices driven by said registers.

34. The method of claim 2, further comprising:
   setting registers in response to said configuration parameters; and
   driving from said registers devices selected from a group consisting of switches and gates, said devices for enabling circuitry in accordance with the configuration parameters.

35. The method of claim 3, wherein said apparatus further comprises:
   registers set by said configuration parameters; and
   devices selected from a group consisting of switches and gates, said devices for enabling circuitry in accordance with the configuration parameters, said devices driven by said registers.

36. The method of claim 18, said method further comprising:
   setting registers in response to said configuration parameters; and
   driving from said registers devices selected from a group consisting of switches and gates, said devices for enabling circuitry in accordance with the configuration parameters.

* * * * *